United States Patent
Baum et al.

(10) Patent No.: US 9,124,463 B2
(45) Date of Patent: Sep. 1, 2015

(54) COMMUNICATION DEVICE WITH SLEEP STATE INDICATOR AND STATE MACHINE CONTROL

(75) Inventors: Avi Baum, Giva'at Shmuel (IL); Ido Shemer, Raanana (IL); Alon Paycher, Beith Hananya (IL); Ofer Guetta, Ganei-Tikva (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 599 days.

(21) Appl. No.: 13/439,497

(22) Filed: Apr. 4, 2012

(65) Prior Publication Data
US 2013/0268788 A1 Oct. 10, 2013

(51) Int. Cl.
*G06F 1/32* (2006.01)
*H04L 25/03* (2006.01)

(52) U.S. Cl.
CPC ........ *H04L 25/03891* (2013.01); *G06F 1/3215* (2013.01); *G06F 1/3278* (2013.01); *Y02B 60/126* (2013.01); *Y02B 60/32* (2013.01)

(58) Field of Classification Search
CPC ... G06F 1/3203; G06F 1/3206; G06F 1/3209; G06F 1/3228; G06F 1/3234; G06F 1/3287; G06F 1/3293; Y02B 60/1203; Y02B 60/1207; Y02B 60/1228; Y02B 60/1278; Y02B 60/1282; H04L 25/03891

USPC .......................................... 713/320, 323, 324
See application file for complete search history.

(56) References Cited

U.S. PATENT DOCUMENTS

| | | | | |
|---|---|---|---|---|
| 6,732,249 | B1* | 5/2004 | Pickreign et al. | 711/202 |
| 7,529,958 | B2* | 5/2009 | Roth et al. | 713/330 |
| 8,078,892 | B2* | 12/2011 | Satoh | 713/320 |
| 8,286,011 | B2* | 10/2012 | Satsangi et al. | 713/300 |
| 8,516,282 | B2* | 8/2013 | Miyazaki | 713/320 |
| 2011/0107116 | A1* | 5/2011 | Diab et al. | 713/300 |

* cited by examiner

*Primary Examiner* — Thuan Du
(74) *Attorney, Agent, or Firm* — Lawrence J. Bassuk; Frank D. Cimino

(57) ABSTRACT

A device with an autonomous sleep characteristic, which is in communication with a host, is described. The device includes one or more communication subsystems. Each communication subsystem maintains a sleep activity indicator that indicates whether a corresponding communication subsystem is allowed to go to sleep. Each communication subsystem can autonomously enter a sleep state, when its sleep activity indicator indicates that the corresponding communication subsystem is, in fact, allowed to go to sleep. The device also includes a controller. The controller has a block memory which stores data written to the device from the host. The controller further includes a sleep state indicator that indicates a sleep state of each communication subsystem.

3 Claims, 4 Drawing Sheets

COMMUNICATION DEVICE WITH SLEEP STATE INDICATOR AND STATE MACHINE CONTROL

TECHNICAL FIELD

The technical field relates in general to the operation of a host and device using a Secure Digital Input Output (SDIO) communication protocol, and more specifically to the sleep activity of communication subsystems in an SDIO device.

BACKGROUND

Secure Digital (SD) refers to a non-volatile memory card format developed by the Secure Digital Card Association for use in portable devices. SD technology is used by more than 400 brands across dozens of product categories and more than 8,000 models. A Secure Digital Input/Output (SDIO) card is an extension of the SD specification that covers input/output functions. The extended SDIO specification can be implemented by a card, but also can be implemented in settings other than a card. Specifically, any device or circuitry that, through programming or hardwiring implements the SDIO protocol, may be referred to as an SDIO device. Such a convention is adopted in this disclosure and reference to an "SDIO device" herein includes any card, circuit, chip, system on chip, and the like that implements the SDIO protocol with respect to a host. The expression "SDIO device" may also be used interchangeably with the expression "SDIO module."

Host devices that support SDIO devices include, for example, personal digital assistants, laptop computers, and/or mobile smart phones. SDIO devices, either in the form of a card, chip, or other circuitry then further support or include various other subsystems acting as functions, such as GPS tuners, modems, FM radio tuners, TV tuners, radio-frequency identification readers, and wireless local area network (WLAN) and Bluetooth interfaces. It should be noted that these examples, as well as those provided in the preceding paragraph, are not intended as comprising an exhaustive list.

The subsystems and/or functions described above are referred to in this disclosure, and in the claims, as "communication subsystems." This terminology reflects that these subsystems generally relate to communication functions, wherein data is transferred to and from the host device from an external source. At a more fundamental level, the "communications subsystems" are defined as SDIO functions, as is known in the art, according to the SDIO protocol.

During the operation of an SDIO system that includes a host and an SDIO device with a communication subsystem, there are intervals where the communication subsystem (for example a Bluetooth or WLAN interface) can be inactive, and the power state is minimized. The communication subsystem is referred to as being "asleep" or "sleeping" during these intervals of power minimization. In a conventional SDIO communication system, the sleep state of a communication subsystem is actually controlled by the host device.

More specifically, in prior art SDIO communication systems, the power state of the communication subsystem is controlled in two ways. Initially, the host device can instruct an SDIO controller in the SDIO device to refuse to allow the communication subsystem to enter a deep sleep state. More simply put, the host device can specify that the communication subsystem never sleeps or powers down.

A second alternative in the control of the power state of a communication subsystem is that the communication subsystem is allowed to enter the deep sleep state. However in the scenario where the communication subsystem is allowed to sleep, prior to writing any data to the communication subsystem, the host device must signal an inquiry to the SDIO device as to whether the communication subsystem is awake. When the communication subsystem is not awake, an SDIO controller in the SDIO device must first awaken the communication subsystem.

Conventionally, the communication subsystem must then become fully awake, and the SDIO controller must signal to the host that communication can begin. Only when the host device has received a signal from the SDIO controller that the communication subsystem is fully awake does the host device provide a continuous write operation to the SDIO device. The alternative scenario in the conventional SDIO system where a communication subsystem is allowed to sleep is characterized by very significant processing overhead.

In a conventional SDIO system, a host device will typically sends a continuous flow of data blocks to the SDIO device following a write command. A conventional SDIO data transfer 500 of multiple data blocks is illustrated in FIG. 5. The conventional SDIO data transfer 500 is initiated by a write command communicated 501 from the host device 521 to the SDIO device 523, using the SDIO protocol command 53 ("cmd53"). A cmd53 indicates an impending data block transfer. In response to the cmd53, the SDIO device 523 sends 503 a response to the host device 521 that it has received the cmd53.

The host device 521 then sends 505 block #0 to the SDIO device 523. The SDIO device 523 responds by sending 507 a cyclic redundancy check (CRC) which indicates whether there has been any accidental change to the raw data sent in block #0. The host device 521 then sends 509 block #1 to the SDIO device 523. The SDIO device 523 again responds by sending 511 a CRC.

This process of transferring data blocks from the host 521 to the SDIO device 523, followed by a response containing a CRC from the SDIO device 523 to the host 521, continues in the same process described above until the host device 521 sends 513 a final or last data block #N. In this instance, the last data block contains an "end of transaction" (EOT) indicator to communicate to the SDIO device 523 that no further data blocks will be transferred from the host device 523. The SDIO device 523 sends 515 a final CRC status response to confirm receipt of the last data block.

As will be seen further below, the conventional SDIO data transfer illustrated in FIG. 5 is useful in explaining the disclosed embodiments presented herein. In particular, the disclosed embodiments make use of the SDIO protocol by using busy signaling to effectuate an autonomous sleep mode for a communication subsystem in an SDIO device. The claimed embodiments are now summarized.

SUMMARY

Accordingly, one embodiment provides a device that is in communication with a host. The device comprises one or more communication subsystems and a controller. Each communication subsystem maintains a sleep activity indicator that indicates whether a corresponding subsystem is allowed to go to sleep. Each communication subsystem is configured to autonomously enter a sleep state, when its sleep activity indicator indicates that the corresponding communication subsystem is allowed to go to sleep.

The controller includes a block memory and a sleep state indicator. The block memory stores data written to the device from the host. The sleep state indicator indicates a sleep state of each communication subsystem.

Another embodiment provides a method that is implemented in a device in communication with a host. The device includes one or more communication subsystems and a controller. The controller includes a block memory and a sleep state indicator that indicates a sleep state of each communication subsystem.

The method comprises the controller storing data written to the device from the host. The method further comprises each communication subsystem maintaining a sleep activity indicator indicating whether its corresponding communication subsystem is allowed to go to sleep. The method lastly comprises each communication subsystem autonomously entering a sleep state, when its sleep activity indicator indicates that the corresponding communication subsystem is allowed to go to sleep.

A final embodiment provides a non-transitory computer readable storage medium with instructions stored thereon. When the instructions are executed by a device, in communication with a host, the device including one or more communication subsystems and a controller that includes a block memory and a sleep state indicator that indicates a sleep state of each communication subsystem, the method described by the second embodiment discussed above is performed.

It should be noted that the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
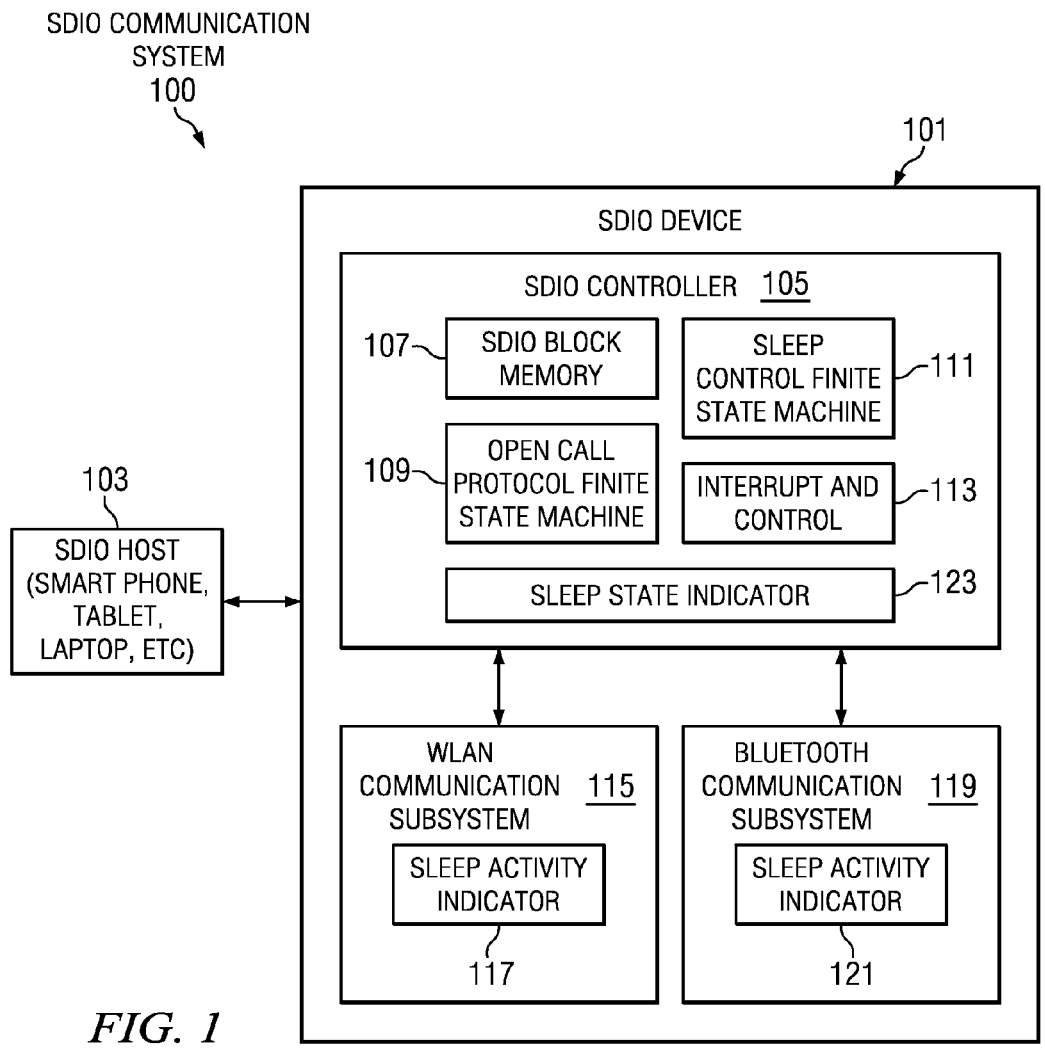
FIG. 1 is a block diagram illustrating an exemplary SDIO communication system, including an SDIO device with an autonomous sleep characteristic.

The present disclosure concerns an SDIO communication system, and the manner in which a communication subsystem and an SDIO device attain a lowered power state (i.e., a sleep state). As discussed above, the conventional art provides that a sleep status of any communication subsystem is controlled by the host device. In contrast, the claimed embodiments provide for completely autonomous sleep behavior on the part of the communication subsystems that comprise the SDIO device. In this manner, transaction overhead between the host device, an SDIO controller, and any communication subsystems is minimized.

In overview, an exemplary SDIO device exhibiting autonomous sleep behavior on the part of corresponding communication subsystems achieves such autonomous sleep behavior in two ways. Initially when a communication subsystem is in a sleep state when a first data block is transmitted by a host, the SDIO device (and more specifically, the SDIO controller) leverages the busy signaling paradigm that is defined by the SDIO standard. In this manner, a host device is made to wait while one or more asleep communication subsystems awaken. The first data block transmitted by the host is meanwhile stored in memory in the SDIO controller.

Once a communication subsystem becomes fully awake, the SDIO controller releases the busy signaling. The SDIO controller forwards the first data block to the communication subsystem, and immediately processes any further SDIO transaction that follow to the communication subsystem. The communication subsystem remains awake until it is allowed to resume sleep mode operation, according to a sleep activity indicator that is cleared. The sleep activity indicator would typically be cleared by the SDIO controller when an EOT message is received by the SDIO controller from the host. In short, the corresponding subsystem interprets the cleared sleep activity register as a signal that it is allowed to power down and enter a sleep state.

In summary the disclosed embodiments are directed toward an SDIO device that autonomously attains a sleep state without sacrificing any functionality between an SDIO device and a host. This instant disclosure is then provided to further explain in an enabling fashion the best modes of performing one or more embodiments. The disclosure is further offered to enhance an understanding and appreciation for the principles and advantages thereof, rather than to limit in any manner the disclosure. The disclosure is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

As described above, an SDIO device can be provided in different forms. Much of the inventive functionality and many of the inventive principles when implemented, may therefore be supported with or in software or integrated circuits (ICs), including possibly a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to provide for an SDIO device with an autonomous sleep characteristic. Specifically referring now to FIG. 1, a block diagram illustrating an exemplary SDIO communication system 100 including an SDIO device 101 with an autonomous sleep characteristic will be discussed and described. As indicated in the drawing, the SDIO communication system 100 includes an SDIO host 103 and an SDIO device 101. As indicated in the drawing, and as discussed above, the host 103 can take the form of any number of top level devices, including a smart phone, a tablet, or a laptop.

As is known in the art, the SDIO host 103 is connected electronically with the SDIO device 101. As such, data can be transferred from the SDIO host 103 to the SDIO device 101. Correspondingly, the SDIO host 103 can receive messages and data transferred from the SDIO device 101.

The SDIO device 101 includes an SDIO controller 105 and two communication subsystems 115, 119. FIG. 1 illustrates that the communication subsystems 115, 119 are a WLAN communication subsystem 115 and a Bluetooth communication subsystem 119. The WLAN communication subsystem 115 includes a sleep activity indicator 117, and the Bluetooth communication subsystem 119 includes a sleep activity indicator 121. It should be noted that there is no restriction as to the number of communication subsystems that may be configured with the SDIO device 101. It is arbitrary that just two communication subsystems 115, 119 are included with the device 101. Also, the choice of a WLAN communication subsystem 115 and a Bluetooth communication subsystem 119 in FIG. 1 (as opposed to other different types of communication subsystems) is purely exemplary.

It should further be noted that placement of the sleep activity indicators 117 and 121 inside the WLAN communication subsystem 115 and Bluetooth communication subsystem 119, respectively, represents a logical placement. That is to say, the actually physical implementation of an indicator may be within the circuitry comprising the SDIO controller 103 or the circuitry comprising the communication subsystems 115, 119. As indicated above, each sleep activity indicator 117, 121 in a corresponding communication subsystem 115, 119 provides an indication to the respective subsystem whether the subsystem is allowed to go to sleep.

A further description of the functioning of the sleep activity indicators 117, 121 is now provided. When the SDIO controller 105 initially processes data to either of the communication subsystems 115, 119 the SDIO controller 105 will set the indicators 117, 121 to reflect that pending data is forthcoming. The communication subsystems 115, 119 will interpret the contents of the indicators 117, 121 as a refusal to allow a respective communication subsystem to go to sleep. Correspondingly, when the SDIO controller 105 receives a last block of data with an EOT included therewith from the host 103, the SDIO controller will clear the indicators 117, 121 to thereby reflect that no additional data is forthcoming from the host 103. The communication subsystems 115, 119 will interpret the clearing of the indicators 117, 121 as permission for a communication subsystem to go to sleep.

The SDIO controller 105 is the part of the SDIO device 101 that is responsible for decoding the host's 103 commands, and propagating the relevant data to and from the selected communication subsystems 115, 119. The SDIO controller 105 includes an SDIO block memory 107, a open call protocol finite state machine (OCP FSM) 109, a sleep control finite state machine (sleep control FSM) 111, an interrupt and control module 113, and a sleep state indicator 123. Each of these components may play a role in effectuating the autonomous sleep characteristic of the SDIO device 101 and the communication subsystems 115, 119.

Initially, the sleep state indicator 123 provides an indication of whether either or both of the WLAN subsystem 115 and the Bluetooth communication subsystem 119 are asleep or awake. Typically, the sleep state indicator 123 would take the form of a status register or flag register, which as is known in the art, is a hardware register which contains information about a process state. Individual bits are implicitly or explicitly read by the SDIO controller 105 to determine the sleep status of the communication subsystems 115, 119.

Figure 2:
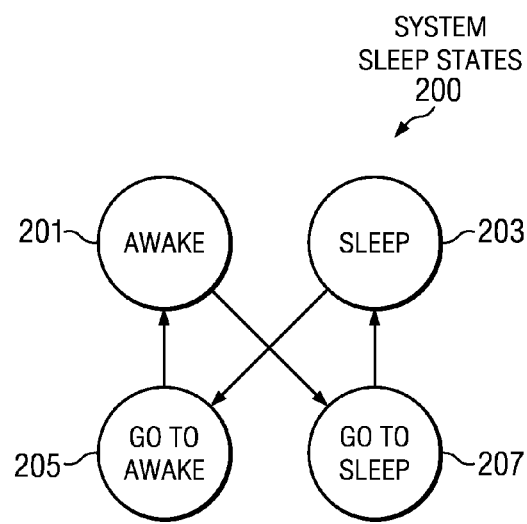
FIG. 2 is a state diagram illustrating four sleep states of a communication subsystem in an SDIO device with an autonomous sleep characteristic.

Generally speaking, there are four sleep status states of the communication subsystems 115, 119 which may be indicated by the sleep state indicator 123. FIG. 2, which is a state diagram illustrating the four sleep states of the communication subsystem 115, 119 in the SDIO device 101 with an autonomous sleep characteristic, is now discussed and described. The four sleep states illustrated in FIG. 2 are: awake 201, asleep 203, go to awake 205, and go to asleep 207.

The logic and processing which provides the transitions from state to state in FIG. 2 is provided in by the sleep control FSM 111 and the interrupt and control module 113. The sleep control FSM 111 is configured to read the current sleep state of the communication subsystems 115, 119 as indicated by the sleep state indicator 123. If necessary, the interrupt and control module 113 will provide a signal to the communication subsystems 115, 119 to undertake certain state transitions based on the what is indicated by the sleep state indicator 123.

Specifically then, if one or both of the WLAN subsystem 115 and the Bluetooth communication subsystem 119 have an "asleep" status 203 in the sleep state indicator 123, the sleep control FSM 111 will provide a signal to the interrupt and control module 113 to provide an interrupt signal that will begin an awaken process in the communications subsystems 115, 119. The sleep control FSM 111 will transition the sleep state indicator 123 to a "go to awake" status 205.

When either or both of the WLAN subsystem 115 and the Bluetooth communication subsystem 119 awaken, they will provide a signal to the sleep and control FSM 111 that they are now awake. The sleep and control FSM 111 then provides a change to the sleep state indicator 123 to reflect an "awake" status 201 on the part of the communication subsystems 115, 119. In addition, the interrupt and control module 113 will control the processing of the SDIO device as is conventional for awake devices.

When the communication subsystems 115, 119 are in an "awake" status, and an EOT indicator is received by the SDIO device 101 as discussed above, the sleep control FSM 111 will reset the sleep state indicator 123 to a "go to sleep" status. Additionally, the interrupt and control module 113 will provide signals to the communication subsystems 115, 119 to being a power down process. When either or both of the WLAN subsystem 115 and the Bluetooth communication subsystem 119 achieved a deep sleep state, the sleep control FSM 111 changes the sleep status indicator 123 to "asleep."

It should be noted that the open call protocol FSM 109 controls the actual transmission of data blocks and other information to the communication subsystems 115, 119 when the communication subsystems 115, 119 are actually awake. The open call protocol establishes a master/slave protocol between the SDIO controller 105 and the communication subsystems 115, 119. When the communication subsystems 115, 119 are asleep, wake-up signals are provided by the interrupt and control module 113 over by sideband signals (not shown).

The last component of the SDIO controller 105 is the SDIO block memory 107. The SDIO block memory 107 may vary in size depending on the host device, but should support data blocks of 256 bytes, 128 bytes, and 64 bytes. As will be discussed further below, the function of the SDIO block memory 107 is to store a first data block transmitted from the SDIO host 103 to the SDIO device 101 when it is determined that the communication subsystems 115, 119 are in a sleep state.

An overview of the operation of the SDIO device 101, which is in communication with the SDIO host 103 according to the SDIO standard 10, is now provided. As described above, each communication subsystem 115, 119 maintains a sleep activity indicator 117, 121. When the sleep activity indicators 117, 121 are controlled by the SDIO controller 105 to indicate that data is pending, the communication subsystems 115, 119 interpret this setting so as to not allow the communication subsystems 115, 119 to transition to an asleep or powered-down state. When the sleep activity indicators 117, 121 are cleared by the SDIO controller 105 so as to indicate that no additional processing is required, the communication subsystems 115, 119 interpret this setting as to now allow the communication subsystems 115, 119 to transition to an asleep or powered-down state. In other words, each communication subsystem 115, 119 is configured to autonomously enter an asleep state, when its sleep activity indicator 117, 119 indicates that the corresponding communication subsystem is allowed to go to sleep.

Also as described above, the SDIO controller 105 includes the block memory 107 that is at least a size of an SDIO block. The block memory 107 stores data written to the SDIO device 101 from the SDIO host 103. In a typical SDIO transaction the SDIO host 103 will communicate a write command to the SDIO device 101 according to the SDIO standard. The write command may include a first data block directed to, for example, either of the WLAN subsystem 115 or the Bluetooth communication subsystem 119. In response to the write command, including the first data block targeted for a particular communication subsystem 115, 119, the SDIO controller 105 (and more specifically the sleep control FSM 111) detects a sleep state of the particular communication subsystem 115, 119 indicated by the sleep state indicator 123.

When the SDIO controller 105 (and more specifically the sleep control FSM 111) determines that the particular communication subsystem 115, 119 to which the first data block is directed is currently asleep, the SDIO controller 105 stores the first data block in the SDIO block memory 107. The SDIO controller 105 (and more particularly the interrupt and control module 113) then provides a signal to the particular communication subsystem 115, 119 to wake up. The SDIO controller 105 (and more particularly the open call protocol FSM 109) further issues busy signaling to the SDIO host 103 using standard SDIO signaling. As is known in the art related to the SDIO standard, the busy signaling thereby inhibits further transactions from the SDIO host 103.

In response to the signal to wake up provided by the SDIO controller 105, the particular communication subsystem 115, 119 actually wakes up. The particular communication subsystem 115, 119 then communicates to the SDIO controller 105 that its sleep status is awake. The SDIO controller 105 (and more particularly the open call protocol FSM 109) stops issuing the busy signaling to the SDIO host 103. The SDIO host 103 then proceeds with a continuous transfer of data blocks to the SDIO device 101.

Meanwhile, the SDIO controller 105 (and more particularly the open call protocol FSM 109) transfers the first data block that is stored in the SDIO block memory 107 to the particular communication subsystem 115, 119. The SDIO controller 105 (and more specifically the sleep control FSM 111) also updates the sleep state indicator 123 to indicate that the sleep state of the particular communication subsystem 115, 119 is awake. After the SDIO controller 105 transfers the first data block stored in the SDIO block memory 107 to the particular communication subsystem 115, 119, the SDIO controller 105 (and more particularly the open call protocol FSM 109) further transfers all other data blocks, in a related SDIO transaction to the first data block, directly to the particular communication subsystem 115, 119. That is to say, once the sleep and control FSM 111 provides a change to the sleep state indicator 123 to reflect an "awake" status 201 on the part of the communication subsystems 115, 119, processing according to the SDIO standard occurs as normal: the host 103 transmits related blocks in the SDIO transaction to the SDIO device 101, which are immediately transferred to the particular communication subsystem 115, 119 that is the subject of the SDIO transaction.

Once normal processing according to the SDIO standard is ongoing between the SDIO host 103 and the SDIO device 101, the SDIO controller eventually receives from the SDIO host 103 a last data block in the related SDIO transaction to first block (with an EOT signal). The SDIO controller 105 then clears the sleep activity indicator 117, 121 in the particular communication subsystem 115, 119. As indicated above, clearing the sleep activity indicators 117, 121 allows the communication subsystem 115, 119 to autonomously enter the sleep state.

It should be noted that when the SDIO host 103 first communicates a write command (cmd53) to the SDIO device 101 according to the SDIO standard, and when the SDIO controller 105 (and more specifically the sleep control FSM 111) detects, based on a sleep state of the particular communication subsystem 115, 119 indicated by the sleep state indicator 123, whether the particular communication subsystem 115, 119 is currently asleep, it may be determined that the particular communication subsystem 115, 119 is actually already awake.

When the SDIO controller 105 determines that the particular communication subsystem 115, 119 is actually already awake (in an awake state), the SDIO controller transfers the first data block, and all other data blocks received from the SDIO 103 host in a related SDIO transaction, directly to the particular communication subsystem 115, 119. Of course, when the SDIO controller 105 receives a last data block in the related SDIO transaction from the SDIO host 103, the SDIO controller 105 clears the sleep activity indicator 117, 121 in the particular communication subsystem 115, 119. As indicated above, clearing the sleep activity indicator 117, 121 allows the communication subsystem 115, 119 to autonomously enter the sleep state.

Figure 3:
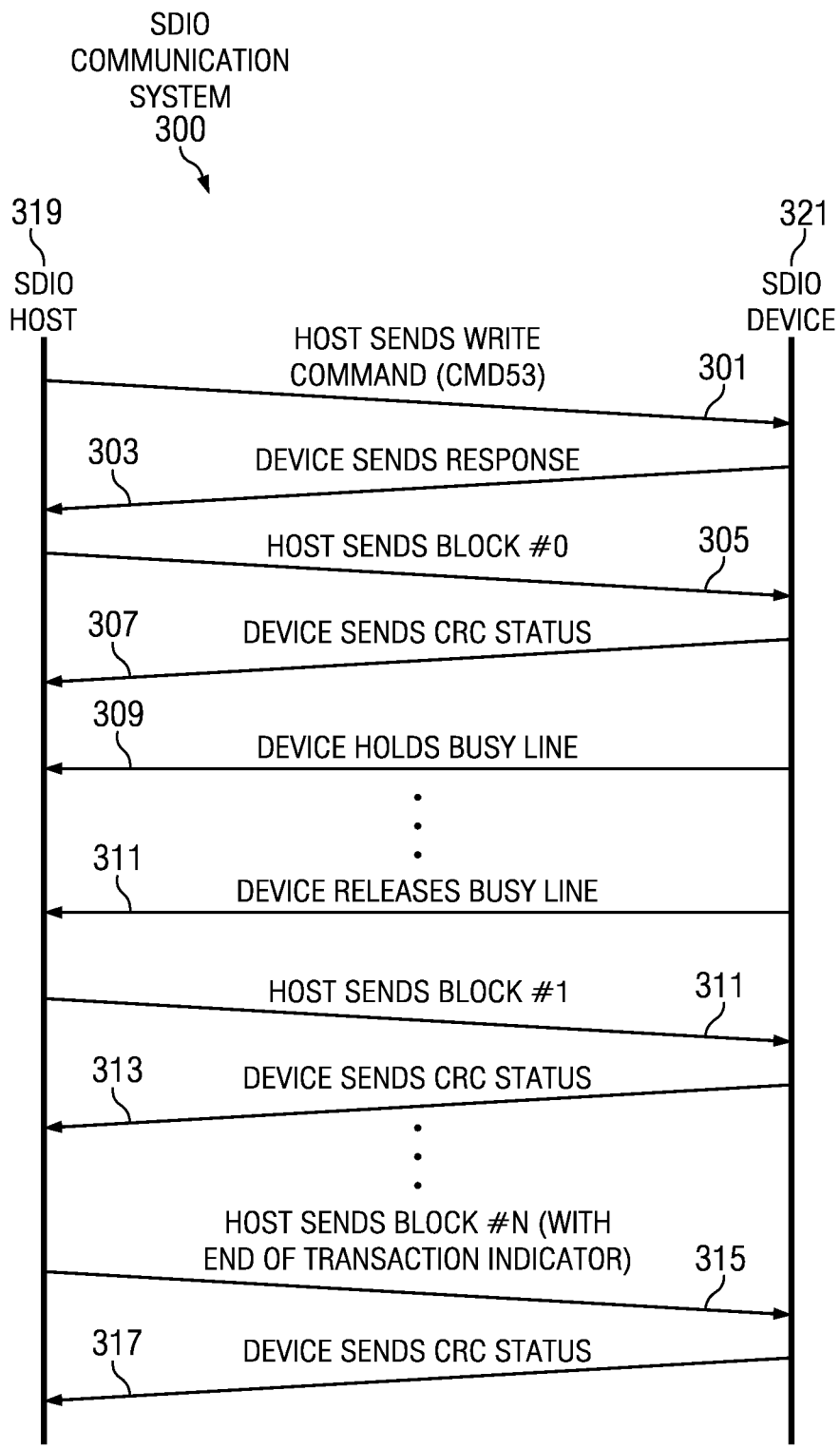
FIG. 3 is a data flow diagram illustrating the operation of an exemplary SDIO communication system that includes an SDIO device with an autonomous sleep characteristic.

In order to better demonstrate the manner in which the SDIO controller 105 issues busy signaling to the SDIO host 103 using standard SDIO signaling as well as the manner in which the SDIO controller 105 stops issuing the busy signaling to the SDIO host 103, FIG. 3, which is a data flow diagram illustrating the operation of an exemplary SDIO communication system that includes an SDIO device 321 with an autonomous sleep characteristic, is now discussed and described.

Similar to a conventional SDIO system, in the SDIO communication system 300 an SDIO data transfer is initiated by a write command communicated 301 from the host device 319 to the SDIO device 321, using the SDIO protocol command 53 ("cmd53"). In response to the cmd53, the SDIO device 321 sends 303 a response to the host device 319 that it has received the write cmd53.

The host device 319 then sends 305 block #0 to the SDIO device 321. The SDIO device 321 responds by sending 307 a cyclic redundancy check (CRC) which indicates whether there has been any accidental change to the raw data sent in block #0. In contrast to the conventional SDIO communication system however, the SDIO device 321 (and more specifically an SDIO controller and a sleep control FSM) also determines the sleep status of a particular communication subsystem to which the data transfer is directed. As discussed above, the sleep status of a particular communication subsystem is determined by an SDIO controller referencing a sleep state indicator.

In FIG. 3, it is assumed that one or more communication subsystems, such as a WLAN communication subsystem or a Bluetooth communication subsystem is asleep. As discussed above, once an SDIO controller in the SDIO device 321 determines that a communication subsystem is asleep, a signal is provided by an interrupt and control module to the one or more communication subsystems to begin a wake-up process. Additionally, the initial block #0 will be in an SDIO block memory.

While the SDIO device waits for one or more of the communication subsystems to wake up, the SDIO controller sets the sleep indicator status to "go to awake," and then holds a busy line 309 according to the SDIO protocol. As is known in the art, when the SDIO dev ice 321 holds a busy line 309, the SDIO host 310 will refrain from transferring any further data blocks. The SDIO device 321 then simply waits for one or more of the communications subsystems to become fully awake.

When one or more of the communications subsystems become fully awake, the SDIO controller in the SDIO device 321 sets the sleep indicator status to "awake." The SDIO device 321 then releases the busy line 311 according to the SDIO protocol. As is known in the art, when the SDIO dev ice 321 releases a busy line 311, the SDIO host 310 will resume with the transfer of data blocks to the SDIO device 321. Specifically, the host device 319 then sends 311 block #1 to the SDIO device 321. The SDIO device 321 responds by sending 313 a CRC.

Figure 5:
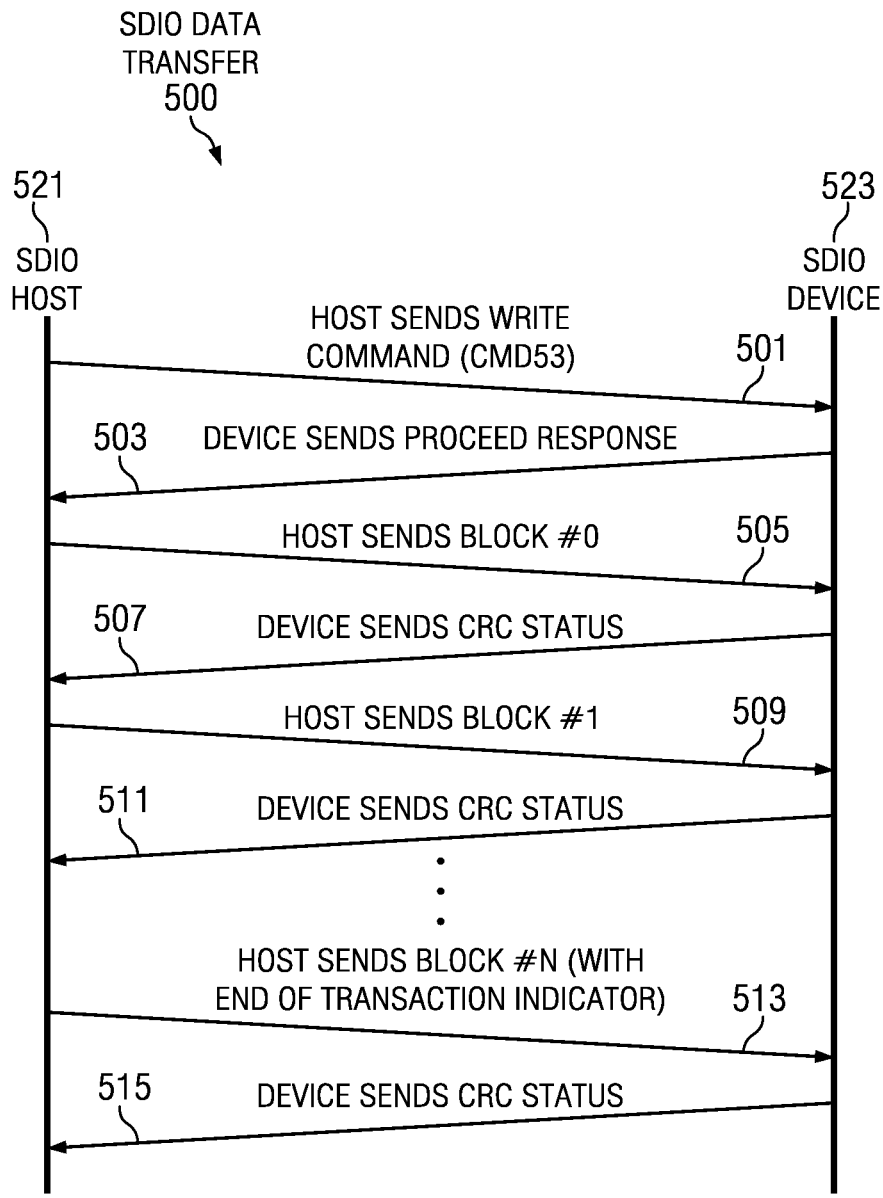
FIG. 5 is a data flow diagram illustrating the operation of a prior art SDIO communication system.

This process of transferring data blocks from the host 319 to the SDIO device 321, followed by a response containing a CRC from the SDIO device 321 to the host 319, continues in the same process described above with respect to FIG. 5 until the host device 319 sends 315 a final or last data block. As with the conventional art, the last data block contains an EOT indicator to communicate to the SDIO device 321 that no further data blocks will be transferred from the host device 319. The SDIO device 321 sends 317 a final CRC status response to confirm receipt of the last data block. As described, the EOT indicator provided in the last block may serve to alert the SDIO device 321 to clear any activity registers in one or more communication subsystems so that the one or more communication subsystem may autonomously enter a sleep state after any necessary processing is completed.

In the above discussion and in the drawings, it may appear that there are plural communication subsystems that are each independently connected with the SDIO controller. It should first be noted that it is not necessary that there be more than one communication subsystem. However assuming that in a particular configuration there are plural communication subsystems, it should further be noted that the plural communication subsystems may be connected by a common interface to the SDIO controller. That is to say, plural communication subsystems may either be independently connected with an SDIO controller or they may share a common interface to the SDIO controller.

Additionally, although the above discussion and drawings may indicate that one communication subsystem is either awake or asleep while other communication subsystems have an opposite status, this is not necessarily the case. That is to say, it is envisioned that all of the plural communication subsystems may either be awake or asleep simultaneously. Contrary wise, it is also envisioned that among the plural subsystems, certain of them may be awake or asleep while other of them may have an opposite sleep status.

Figure 4:
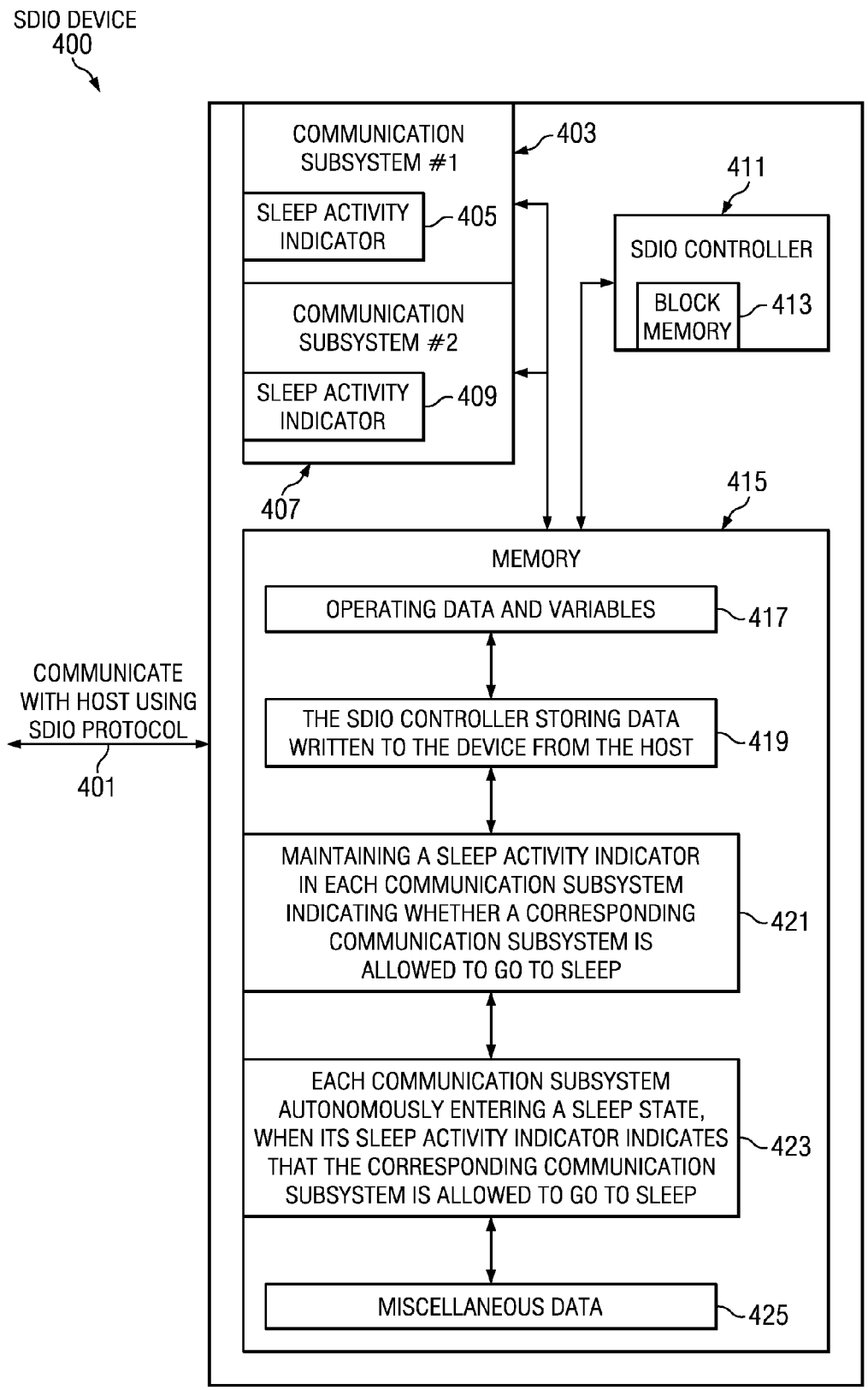
FIG. 4 is a block diagram illustrating an exemplary SDIO device with an autonomous sleep characteristic.

Referring now to FIG. 4, block diagram illustrating an exemplary SDIO device 400 with an autonomous sleep characteristic will be discussed and described. The SDIO device 400 includes a communication subsystem #1 403, with a sleep activity indicator 405, and a communication subsystem #2 with a sleep activity indicator 409. The SDIO device 400 further includes an SDIO controller 411 with a block memory 413. As indicated in the drawing, the SDIO device 400 is able to bilaterally communicate 401 with a host using the SDIO protocol.

The SDIO controller 411, the communication subsystems #1 403, and the communication system #2 407 are all bilaterally coupled with a memory or memory area 415. The memory 415 may comprise a read-only memory (ROM), a random-access memory (RAM), a programmable ROM (PROM), and/or an electrically erasable read-only memory (EEPROM). The memory 415 may include multiple memory locations for storing, among other things, operating data and variables 417 for implementing the operating-system-like aspects of the SDIO controller 411, the communication subsystem #1 403, and the communication system #2 407, as well as the functionality of the SDIO device 400.

In particular, the memory 415 stores data and variables for the function of the SDIO controller storing 419 data written to the SDIO device 400 from the host. The memory 415 further stores data and variables for the function of maintaining 421 a sleep activity indicator 405, 407 in each communication subsystem 403, 407 that indicates whether a corresponding communication subsystem 403, 407 is allowed to go to sleep. The memory 415 further stores data and variables for the function of each communication subsystem 403, 407 autonomously entering 423 a sleep state when its sleep activity indicator 405, 407 indicates that the corresponding communication subsystem is allowed to go to sleep. It should lastly be noted that the memory 415 additionally includes a miscellaneous database 425 for storing other data not specifically mentioned herein.

This disclosure is intended to explain how to fashion and use various embodiments in accordance with the disclosure rather than to limit the true, intended, and fair scope and spirit thereof. The disclosure is defined solely by the appended claims, as they may be amended during the pendency of this application for patent, and all equivalents thereof. The foregoing description is not intended to be exhaustive or to limit the disclosure to the precise form disclosed. Modifications or variations are possible in light of the above teachings. The disclosed embodiments were chosen and described to provide the best illustration of the principles of the disclosure and its practical application, and to enable one of ordinary skill in the art to utilize the disclosure in various embodiments and with various modifications as are suited to the particular use contemplated. All such modifications and variations are within the scope of the disclosure as determined by the appended claims, as may be amended during the pendency of this application for patent, and all equivalents thereof, when interpreted in accordance with the breadth to which they are fairly, legally, and equitably entitled.

What is claimed is:

1. A communication device comprising:
(A) host communication leads;
(B) subsystem communication leads;

(C) controller circuitry coupled to the host communication leads and to the subsystem communication leads, the controller circuitry including:
  i) memory circuitry coupled between the host communication leads and the subsystem communication leads;
  ii) sleep state indicator circuitry coupled to the subsystem communication leads and containing sleep status bits indicating a sleep status state from the subsystem communication leads; and
  iii) sleep control finite state machine circuitry coupled to the sleep state indicator circuitry for reading a sleep status bit.

2. The communication device of claim 1 in which the sleep control finite state machine circuitry transitions among states of awake, go to sleep, sleep, and go to awake.

3. The communication device of claim 1 in which the memory circuitry is large enough to contain a block of data from the host communication leads.

* * * * *